United States Patent [19]

Roehringer

[11] Patent Number: 4,898,074
[45] Date of Patent: Feb. 6, 1990

[54] SERVO-VALVE ARRANGEMENT FOR POWER STEERING

[75] Inventor: Arno Roehringer, Ditzingen, Fed. Rep. of Germany

[73] Assignee: Daimler-Benz AG, Stuttgart, Fed. Rep. of Germany

[21] Appl. No.: 214,387

[22] Filed: Jul. 1, 1988

[30] Foreign Application Priority Data

Jul. 2, 1987 [DE] Fed. Rep. of Germany ..... 37218263

[51] Int. Cl.$^4$ .......................... F18P 9/10; B62D 00/00
[52] U.S. Cl. ........................................ 91/371; 91/372; 91/374
[58] Field of Search ................... 91/370, 371, 372, 374, 91/385

[56] References Cited

U.S. PATENT DOCUMENTS

| 2,679,234 | 5/1954 | Robinson | 91/374 X |
| 4,531,602 | 7/1985 | Roehringer | 91/434 X |
| 4,651,622 | 3/1987 | Yoshida | 91/370 |
| 4,665,797 | 5/1987 | Bacardit | 91/370 |
| 4,766,801 | 8/1988 | Hachisuka | 91/371 |

FOREIGN PATENT DOCUMENTS 3346707 7/1985 Fed. Rep. of Germany.
3625003 2/1987 Fed. Rep. of Germany.
WO 86/02053 4/1986 World Int. Prop. O..

Primary Examiner—Robert E. Garrett
Assistant Examiner—Williamson

[57] ABSTRACT

In a servo-valve arrangement, a control piston is displaced as a function of steering forces to be applied which control piston in its turn controls throttling places in such a manner that a piston-cylinder aggregate is acted upon with a pressure difference and produces a force assisting the steering movement. A throttling section connected in parallel with the piston cylinder aggregate includes throttling places controlled by external parameters as well as by the system pressure and makes it possible to act upon the end faces of the control piston with a pressure difference in order to permit a force opposing the respective displacement of the control piston to act on the control piston. As a result thereof, an undesired overcontrol of the servo-valve arrangement, respectively, of the steering system controlled thereby is avoided.

16 Claims, 4 Drawing Sheets

SERVO-VALVE ARRANGEMENT FOR POWER STEERING

BACKGROUND AND SUMMARY OF THE INVENTION

The present invention relates to a servo-valve arrangement with high pressure and low pressure connections and two parallel throttle sections leading from the high pressure side and which is provided to the low pressure side with series-connected controllable throttling places on the high-pressure and low-pressure side. Two separate motor connections branches off from the throttle sections each between the high-pressure and low-pressure sides thereof for the connection of input and outlet lines of a servo-motor. A control piston simultaneously controls the throttling places which, for purposes of producing a controllable pressure difference between the motor connections, increases the resistance of the high pressure side throttling place with an adjustment as well as reduces the resistance of the low pressure side throttling place, while simultaneously reducing at the other throttling place the resistance of the high pressure side throttling place as well as increasing the resistance of the low pressure side throttling place. Two piston working spaces are coordinated to separate operating surfaces of the control piston which, upon actuation with different pressures, permit the production of a force opposing the respective displacement of the piston. A third throttle section having a throttling place and a controllable throttle for changing the actuating forces of the servo-valve arrangement in dependence on control magnitudes.

A servo-valve arrangement of this type is described in the DE-OS 36 25 003. In this prior art arrangement, the end faces of the control piston are arranged in separate chambers which are each connected by way of a check valve opening in the direction of the chamber with one of the motor connections, respectively, with spaces connected therewith. The two chambers are connected with each other by way of a line which is connected between two series-connected throttling places with a throttle valve arrangement leading to a pressureless reservoir. This throttle valve arrangement is controlled in dependence on the driving velocity of a vehicle as well as in dependence on the system pressure. A more or less large pressure difference will thereby establish itself between the chambers depending on the throttling resistance of the throttle valve arrangement when the control piston establishes differing Pressures at the motor connections by a corresponding displacement. As a result thereof, the actuating forces of the servo-valve arrangement can be changed in order to prevent that the servo-valve arrangement will be overcontrolled unintentionally.

It is the object of the present invention to provide a servo-valve arrangement in which the forces acting back on the control piston can be varied in very different ways combined with low constructive expenditures.

The underlying problems are solved according to the present invention in that the one piston working space is arranged on the one side of the one throttling place and the other piston working space on the other side of the one throttling place which is arranged as part of the third throttle section between the motor connections or the piston working spaces connected therewith in series with further controllable throttles which are controllable in dependence on external control magnitudes and pressure differences occurring at the third throttling place.

The present invention is based on the recognition that it suffices to arrange between the motor connections a series of controllable throttling places and to act upon the piston working spaces with different pressures corresponding to the pressure drop at one throttling place. Notwithstanding this simple arrangement, a very flexible working behavior of the servo-valve arrangement can be achieved.

According to a preferred embodiment of the present invention, provision is made that the one of the controllable throttles in the third throttle section is an externally controllable throttle and the other is a throttle controllable by the pressure drop at the throttling place between the piston working spaces. On the basis of this construction of the servo-valve arrangement, a servo-control can be attained with a variable proportional range and a constant limitation of the actuating force.

In a second preferred embodiment of the present invention, provision is made that the one of the controllable throttles in the third throttling section is an externally controllable throttle and the other is a throttle adjustable by the pressure drop at the externally controllable throttle. With this construction of the servo-valve arrangement, a servo-control with a variable proportional range and a variable limitation of the actuating force can be created.

Therebeyond, it may also be appropriate to additionally arrange within the third throttle section a throttle controllable by the pressure difference between the motor connections. A servo-control with a variable proportional range having two ranges of different proportionality and a constant limitation of the actuating force can be achieved therewith.

In a constructively particularly preferred embodiment of the present invention, provision is made for piston working spaces to be arranged at end-face of the control piston. The control piston is traversed by a longitudinal bore and a further piston is slidingly displaceably guided in the longitudinal bore of the control piston against a spring force from its normal position in opposite directions. The further piston is traversed by a further longitudinal bore with a throttling place. The control piston and the further piston have mutually overlapping radial openings which form a throttling resistance dependent on the relative displacement between the control piston and the further piston and connect with a space connected with one motor connection as well as the further longitudinal bore of the further piston on one side of the throttling place arranged therein. The piston working space located on the other side of this throttling place being arranged in the further piston and communicates by way of the externally controllable throttle with the other motor connection, respectively, with a space connected therewith.

With this arrangement, all throttling places of the third throttle section with the exception of the externally controllable throttle, are arranged inside of the control piston so that a particularly simple construction is attained, for essentially only the further piston must be displaceably arranged inside of the control piston against spring force.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
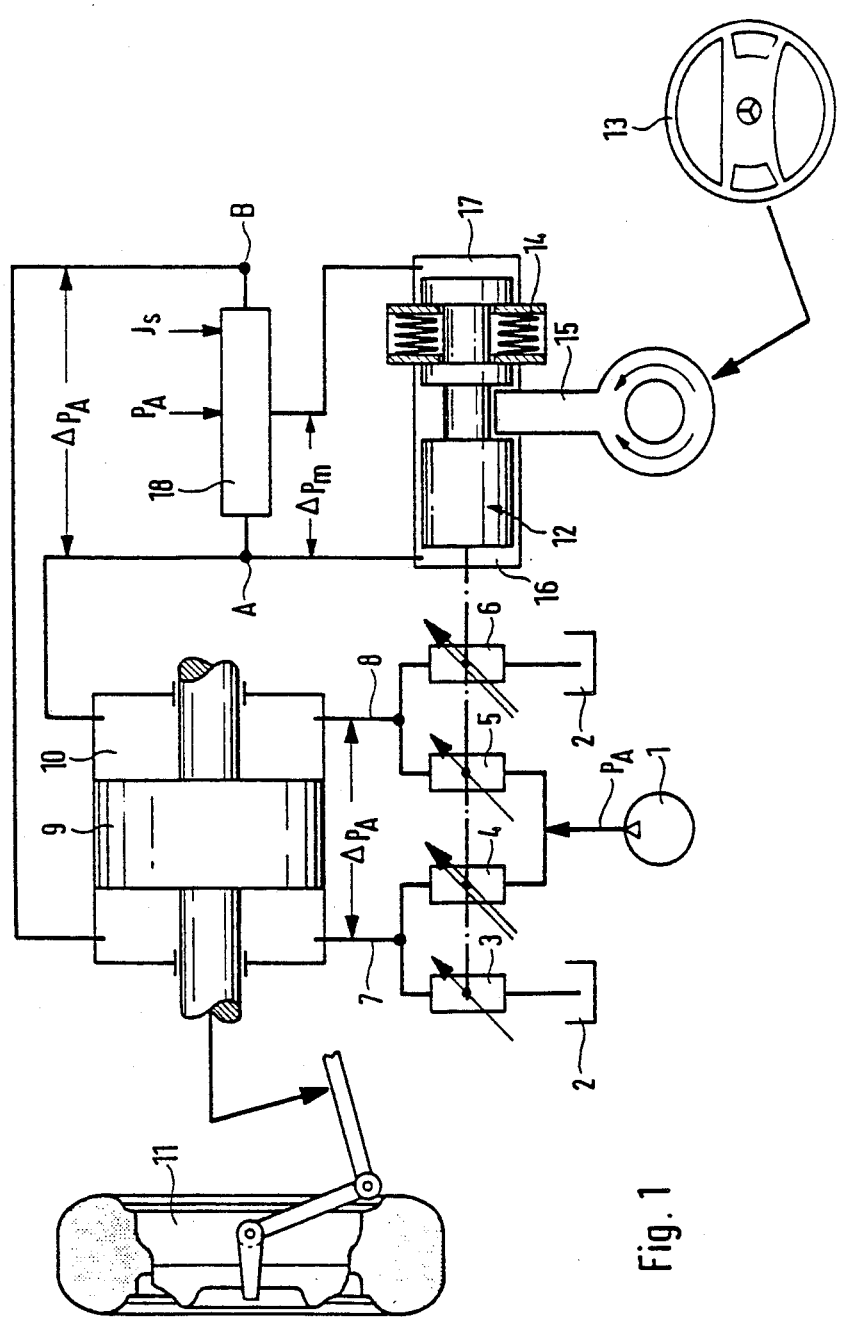
FIG. 1 is a schematic view of a servo-steering system of a motor vehicle with a servo-valve arrangement in accordance with the present invention.

Referring now to the drawing wherein like reference numerals are used throughout the various views to designate like parts, and more particularly to FIG. 1, in this figure a servo-pump 1 is connected on the suction side with a reservoir 2 for hydraulic medium and on the pressure side with two throttle sections leading to the reservoir which are formed by controllable throttling places 3 and 4, respectively, 5 and 6. The throttling places 3 to 6 can be controlled simultaneously in such a manner that the throttling resistance of the throttling places with the even reference numerals 4 and 6 are changed in one direction, for example, is increased, whereas the throttling resistance of the throttling places with the uneven reference numerals 3 and 5 is changed in the other direction, for example, decreases. As a result thereof, a pressure difference $\Delta p_A$ is produced in the one or other direction between motor connections 7 and 8 which are connected between the throttling places 3 and 4, respectively, 5 and 6. The motor connections 7 and 8 are connected on both sides of a piston 9 of a piston cylinder aggregate 10 arranged as servo-motor so that the piston 9 is acted upon by the pressure difference $\Delta p_A$ and actuates the steerable wheels 11 of a steered vehicle axle with a corresponding force in the one or the other steering direction.

The throttling places 3 to 6 integrated into a servo-valve arrangement are actuated simultaneously by a control piston 12 of the servo-valve arrangement. Upon actuation of a steering hand wheel 13 the control piston 12 is displaced toward the right or toward the left against the force of a spring aggregate 14 by an actuating lever 15 which, upon actuation of the steering hand wheel 13 carries out an adjusting stroke dependent on the actuating direction as well as the steering resistance.

In order to avoid that the servo-control provides a labile driving sensation and causes the driver unintentionally to over-control the servo-control, piston working spaces 16 and 17 arranged at the end faces of the control piston 12 can be acted upon controllably with different pressures so that an adjusting force dependent on a pressure difference $\Delta p_m$ acts on the control piston 12 which opposes the respective displacement of the control piston 12.

The pressure difference $\Delta p_m$ is produced by means of a third throttle section 18 which is connected between the two chambers of the piston-cylinder aggregate 10, respectively, between the motor connections 7 and 8 or spaces connected therewith. In a manner to be described more fully hereinafter, the pressure difference $\Delta p_m$ which can be picked up at the third throttle section 18, can be influenced by an external control magnitude $J_s$ which, as a rule, depends on the driving velocity v, as well as by the pressure difference $\Delta p_A$ which exists between the motor connections 7 and 8.

Figure 2:
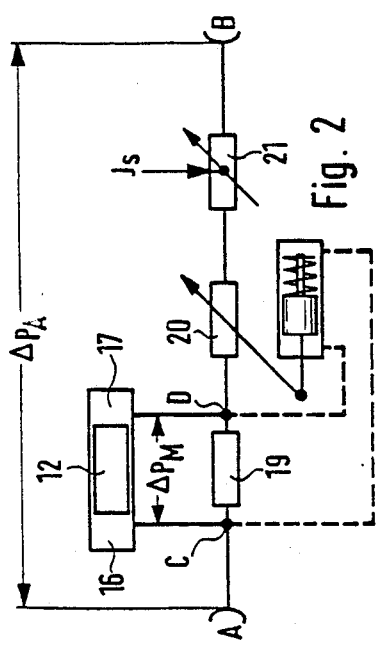
FIG. 2 is a schematic view of a first embodiment of the third throttle section in accordance with the present invention.

FIG. 2 now illustrates a first embodiment for a throttle section 18 adapted to be interconnected between the points A and B in FIG. 1. According to FIG. 2, this throttle section 18 consists of a throttling place 19 with constant throttling cross section, of a controllable throttling place 20 whose throttling cross section is dependent on the pressure difference $\Delta p_m$ occurring at the throttling place 19 as well as of a controllable throttling place 21 whose throttling resistance is controlled in dependence on an external magnitude $J_s$. The piston working spaces 16 and 17 (see FIG. 1) are connected at the points C and D of the throttle section formed by the throttling places 19 to 21 so that the pressure difference $\Delta p_m$ acts on the control piston 12 which, in its turn, depends on the pressure difference $\Delta p_A$ between the motor connections as well as the external control magnitude $J_s$.

Figure 3:
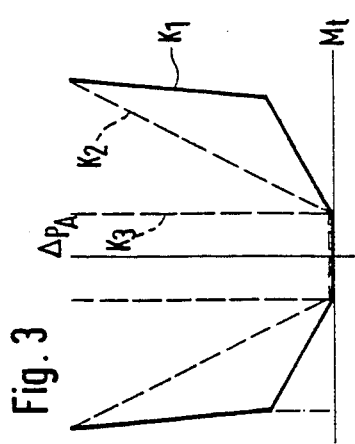
FIG. 3 is a diagram illustrating the characteristic curves attainable with the embodiment according to FIG. 2.

FIG. 3 now illustrates the characteristic curves attainable with this arrangement. The amount of the pressure difference $\Delta p_A$ between motor connections 7 and 8 is thereby plotted as a function of the actuating torque $M_t$ to be applied at the steering wheel 13. Three different curves $K_1$ to $K_3$ are illustrated in this figure which represent the conditions, for example, for different adjustments of the externally controllable throttling place 21. No pressure difference $\Delta p_A$ is produced between the motor connections 7 and 8 within a central range which is determined by the prestress of the spring aggregate 14. With greater actuating moments $M_t$ a proportional range will establish itself dependent on the adjustment of the throttling place 21. With still higher actuating moments $M_t$, the pressure difference $\Delta p_A$ is so strongly increased that practically a limitation of the actuating moment $M_t$ occurs. Any desired characteristic curve between the curves $K_1$ and $K_3$ can be attained by a corresponding control of the throttling place 21.

Figure 4:
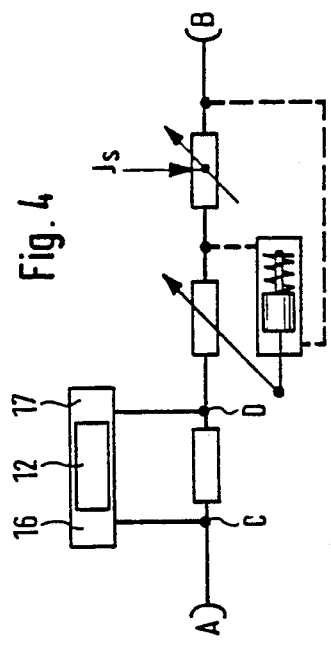
FIG. 4 is a schematic view of a second embodiment of the third throttle section in accordance with the present invention.

The arrangement illustrated in FIG. 4 corresponds essentially to the arrangement according to FIG. 2, however, the throttling cross section of the throttling place 20 is controlled in dependence on the pressure difference which occurs at the throttling place 21.

Figure 5:
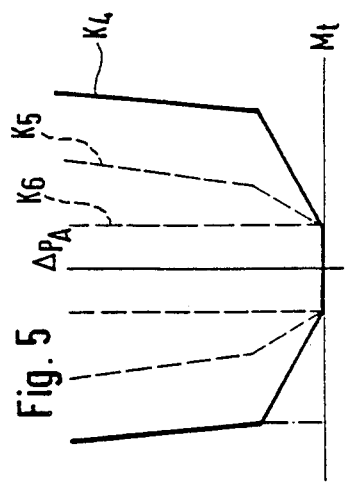
FIG. 5 is a diagram illustrating the characteristic curves attainable with the embodiment of FIG. 4.

With this arrangement, the characteristic curves $K_4$ to $K_6$ illustrated as examples in FIG. 5 can be attained whereby again by a corresponding control of the throttling place 21 any desired points are attainable between the curves $K_4$ and $K_6$. A variable proportional range with variable limitation of the actuating moment $M_t$ is attained correspondingly.

Figure 6A:
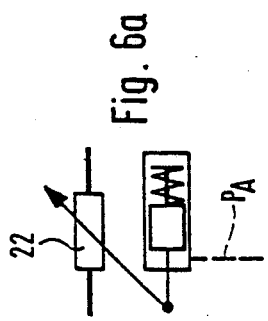
FIG. 6a is a modified detail of the embodiment according to FIG. 6.
Figure 6:
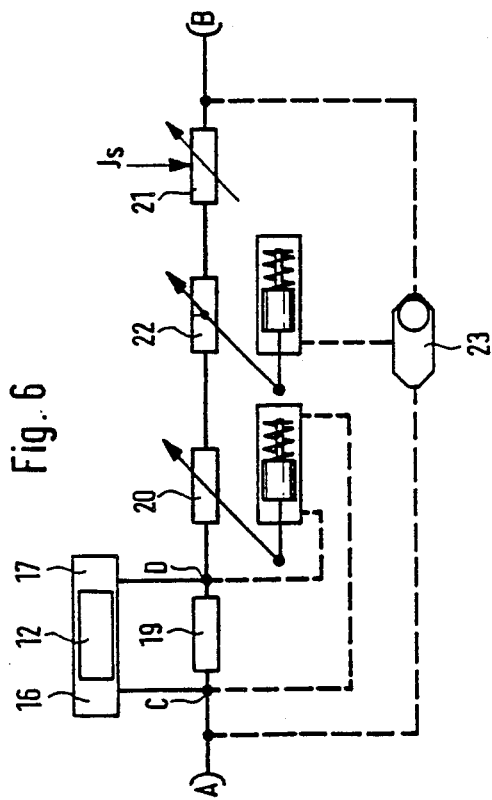
FIG. 6 is a schematic view of a third embodiment of the third throttle section in accordance with the present invention.

The arrangement illustrated in FIG. 6, respectively, 6a corresponds to the arrangement according to FIG. 2, however, a further throttling place 22 is additionally provided whose throttling cross section is controlled either directly by the pressure difference $\Delta p_A$ or by the absolute pressure $p_A$ (see also FIG. 1). In the former case (FIG. 6), a line with a double seat valve 23 is arranged between the points A and B which keeps this line permanently closed with the occurrence of a pressure difference between the points A and B, but which connects an actuating device of the throttling place 22, respectively, with the point A or B at which the respectively higher pressure exists. With the control by the absolute pressure $p_A$ (FIG. 6a), the valve 23 is dispensed with and the pressure $p_A$ acts directly on the area of the throttling place 22.

Figure 7:
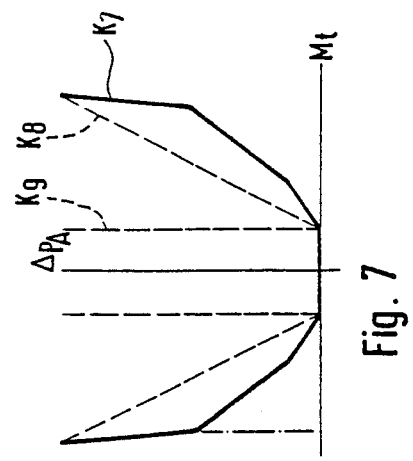
FIG. 7 is a digram illustrating the characteristic curves obtainable with the embodiment of FIG. 6.

According to FIG. 7, the characteristic curves $K_7$ to $K_9$ which are illustrated as examples, can be attained, that is, a variable proportional range with two sections of differing slope as well as a constant limitation of the actuating moment $M_t$. Again, all of the points between the curves $K_7$ and $K_9$ can be attained by a corresponding control of the throttling place 21.

Figure 8:
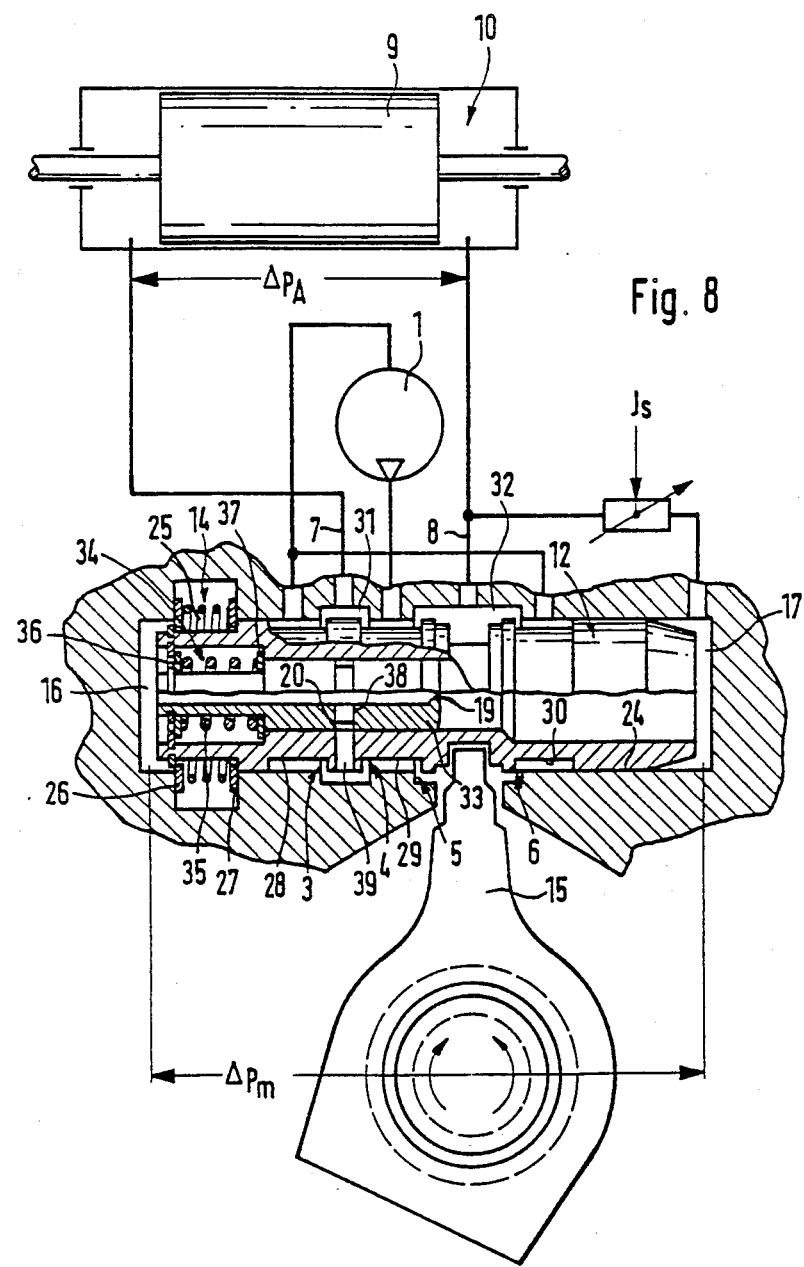
FIG. 8 is a cross-sectional view of a servo-valve arrangement in which a third throttle section corresponding to that of FIG. 2 is realized.

In the embodiment illustrated in FIG. 8, the control piston 12 is slidingly displaceably arranged in a bore 24 of a valve housing. The displacement of the control piston 12 takes place by means of the actuating lever 15 whose free end engages into a circumferential groove of the control piston 12. The displacement of the control piston 12 takes place against the force of a spring aggregate generally designated by reference numeral 14 which consists of a coil compression spring 25 that is clamped-in prestressed against two annular disks 26 and 27 that in their turn are urged by the coil compression spring 25 against annular steps, respectively, abutments at the wall of the bore 24, respectively, the outer circumference of the control piston 12. If, for example, the control piston 12 is displaced toward the right in FIG. 8, then the annular step on the side of the control piston takes along the annular disk 26 whereas the other annular disk 27 is held fast by the annular step on the side of the bore so that the annular disks 26 and 27 are moved toward one another with additional stressing of the coil compression spring 25.

Piston grooves 28 to 30 surrounding annularly shaped the control piston are arranged between the end faces of the control piston 12 which at the ends of the bore 24 seal off the piston working spaces 16 and 17 with respect to the central area of the bore 24; the piston grooves 28 to 30 cooperate with annular grooves 31 and 32 on the side of the housing in that the throttling places 3 to 6 are formed between the annular edges formed by the piston grooves 28 to 30 and the annular grooves 31 and 32 on the side of the housing, whereby the throttling cross sections of the throttling places 3 to 6 are enlarged, respectively, reduced in case of a displacement of the control piston 12. If, for example, the control piston 12 is displaced toward the left in FIG. 8, then the throttling places 3 and 5 become narrower whereas the cross section of the throttling places 4 and 6 become wider.

The pressure line of the servo-pump 1 terminates in the bore 24 between the annular grooves 31 and 32 on the side of the housing and therewith within the area of the center piston groove 29. The suction side of the servo pump 1 (or a reservoir not illustrated) is connected laterally outside of the annular grooves 31 and 32 on the side of the housing and therewith within the area of the outer piston grooves 28 and 30. The motor connections 7 and 8 are arranged at the annular grooves 31 and 32 on the side of the housing, i.e., between the throttling places 3 and 4, respectively, 5 and 6, which lead to the piston cylinder aggregate 10, only schematically illustrated.

The one motor connection 8 is connected with the piston working space 17 by way of a line in which is arranged the controllable throttling place 22 adapted to be influenced by an external control magnitude.

A longitudinal bore is arranged inside of the control piston 12 in which a further piston 33 is slidingly displaceably guided. The displacement takes place against the resistance of a spring aggregate generally designated by reference numeral 34 which has a similar construction as the spring aggregate 14. The spring aggregate 34 consists essentially of a coil compression spring 35 which is clamped-in prestressed against two annular disks 36 and 37. The annular disks 36 and 37 abut under the stress of the coil compression spring 35, on the one hand, at annular steps which are provided at the control piston 12 as also at the further piston 33 and, on the other, at abutment rings which are seated in corresponding annular grooves at the inner circumference of the control piston 12, respectively, at the outer circumference of the further piston 33.

The further piston 33 includes a longitudinal bore traversing the same, at the end of which facing the piston working space 17 is arranged the throttling place 19.

The longitudinal bore of the further piston 33 is connected on the left side of the throttling place 19, as viewed in FIG. 8, with the annular groove 31 on the side of the housing, from which branches off the one motor connection 7. For that purpose, a radial bore 38 is provided in the further piston 33 which connects the longitudinal bore of the piston 33 with an annular groove surrounding the same at the piston outer circumference. Within the area of this annular groove, the radial bore 39 is arranged in the control piston 12. In case of a displacement of the further piston 33 relative to the control piston 12, the end of the radial bore 39 pointing toward the further piston 33 is partially closed by the further piston 33, i.e., during a relative displacement between the pistons 12 and 33 the passage formed by the radial bores 38 and 39 is more or less strongly throttled. The radial bores 38 and 39 therefore form the throttle 19 (see FIG. 2) whose throttling cross section is controlled by the pressure difference on the two sides of the throttling place 19, respectively, by the pressure difference between the piston working spaces 16 and 17.

The embodiment according to the present invention illustrated in FIG. 8 therefore realizes the principle of construction illustrated in FIG. 2—in conjunction with FIG. 1.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A servo-valve arrangement, comprising high pressure and low pressure sides, two parallel throttle sections extending from the high pressure side to the low pressure side with series-arranged controllable throttling means on the high pressure and low pressure sides, two separate motor connections for the connection of inlet and outlet lines of a servo motor, said motor connections branching off from the throttle sections between the throttling means on the high pressure and low pressure side, displaceable control piston means simultaneously controlling the throttling means and operable to produce a controllable pressure difference between the motor connections upon displacement to increase the resistance of the throttling means on the high pressure side and to reduce the resistance of the throttling means on the low pressure side of one throttle section and at the same time to reduce at the other throttle section the resistance of the throttling means on the high pressure side and to increase the resistance of the throttling means on the low pressure side, two piston working spaces coordinated to separate working surfaces of the control piston means which upon actuation with different pressures enable the production of a force opposing an actuating force causing displacement of the piston means, and a third throttle section including a series arrangement of further throttling means with a further controllable throttling means, said series arrangement being, parallel to said servo-motor, one of the piston working spaces being connected to one side and the other piston working space being connected to the other side of one of the further throttling means, said other further controllable throttling means being controllable in dependence on external control magnitudes and in dependence of pressure differences occurring in the third throttle section to thereby change the actuating force for the displacement of the control piston means in dependence on said magnitudes and difference.

2. A servo-valve arrangement according to claim 1, wherein one of the other further controllable throttling means in the further throttle section is externally controllable throttle and another is a further throttle means controllable by the pressure drop at the one further throttling means between the piston working spaces.

3. A servo-valve arrangement according to claim 1, wherein one of the further controllable throttling means in the further throttle section is an externally controllable throttle and another further throttle means is a throttle adjustable by the pressure drop at the externally controllable throttle.

4. A servo-valve arrangement according to claim 1, wherein yet another further throttle means is a throttle controllable by the pressure difference between the motor connections and is additionally a part of the third throttle section.

5. A servo-valve arrangement according to claim 1, wherein the piston working spaces are arranged end-face of the control piston means, a longitudinal bore extending through the control piston means, a further piston being slidingly displaceably guided in the longitudinal bore of the control piston means against a spring force from a normal position in opposite directions, wherein the further throttling means comprises a further longitudinal bore having the one further throttling means extending through the further piston, the control piston means and the further piston being provided with mutually overlapping radial openings which form a throttling resistance of the further controllable throttling means and which resistance is dependent on the relative displacement between the control piston means and the further piston and wherein said radial openings connect with each other and a space connected with the one motor connection as with the further longitudinal bore of the further piston on a side of the throttling means arranged therein, and wherein the piston working space disposed on the other side of the one further throttling means arranged in the further piston communicates by way of the externally controllable throttling means with the other motor connection through a space connected therewith.

6. A servo-valve arrangement according to claim 1, wherein the displaceable control piston means is urged into its normal position by spring means.

7. A servo-valve arrangement according to claim 6, wherein a coil compression spring of the spring means disposed inside of an annular space which is arranged between the displaceable control piston means and a housing bore surrounding the same, is clamped-in between two abutment rings movable relative to the housing as well as to the displaceable control piston means, said abutment rings cooperating with abutments, respectively, annular steps, one on the side of the housing and another on the side of the displaceable control piston means in such a manner that upon displacement of the control piston means out of its normal position the abutment ring at one end of the coil compression spring abuts at the abutment, respectively, annular step on the side of the housing and the other abutment ring at the other end or the coil compression spring abuts at the abutment, respectively, annular step on the side of the control piston means and the coil compression spring is increasingly stressed with an increasing distance of the displaceable control piston means from its normal position.

8. A servo-valve arrangement according to claim 5, wherein the radial opening of the further piston terminates in an external circumferential groove at the further piston and the radial opening of the control piston means terminates in an inner circumferential groove at the control piston means.

9. A servo-valve arrangement according to claim 5, wherein one of the further controllable throttling means in the third throttle section is an externally controllable throttle and the other is a throttle controllable by the pressure drop at the throttling means between the piston working spaces.

10. A servo-valve arrangement according to claim 5, wherein one of the further controllable throttling means in the third throttle section is an externally controllable throttle and the other is a throttle adjustable by the pressure drop at the externally controllable throttle.

11. A servo-valve arrangement according to claim 4, wherein the piston working spaces are arranged end-face of the displaceable control piston means, a longitudinal bore extending through the displaceable control piston means, a further piston being slidingly displaceably guided in the longitudinal bore of the control piston means against a spring force from a normal position in opposite directions, a further longitudinal bore having a throttling means extending through the further piston, the control piston means and the further piston being provided with mutually overlapping radial openings which form a throttling resistance dependent on the relative displacement between the control piston means and the further piston and connect each other to a space connected with the one motor connection as well as the further longitudinal bore of the further piston on a side of the throttling means arranged therein, and the piston working space disposed on the other side of the throttling means arranged in the further piston communicating by way of the externally controllable throttling means with a space connected with motor connection.

12. A servo-valve arrangement according to claim 11, wherein the displaceable control piston means is urged into its normal position by spring means.

13. A servo-valve arrangement according to claim 12, wherein a coil compression spring of the spring means disposed inside of an annular space which is arranged between the displaceable control piston means and a housing bore surrounding the same, is clamped-in between two abutment rings movable relative to the housing as well as to the control piston means, said abutment rings cooperating with abutments, respectively, annular steps, one on the side of the housing an another on the side of the control piston means in such a manner that upon displacement of the control piston means out of its normal position the abutment ring at one end of the coil compression spring abuts at the abutment, respectively, annular step on the side of the housing and the other abutment ring at the other end of the coil compression spring abuts at the abutment, respectively, annular step on the side of the control piston means and the coil compression spring is increasingly stressed with an increasing distance of the displaceable control piston means from its normal position.

14. A servo-valve arrangement according to claim 13, wherein the radial opening of the further piston terminates in an external circumferential groove at the further piston and the radial opening of the control piston means terminates in an inner circumferential groove at the control piston means.

15. A servo-valve arrangement according to claim 14, wherein one of the further controllable throttling means in the third throttle section is an externally controllable throttle and the other is a throttle controllable by the pressure drop at the throttling means between the piston working spaces.

16. A servo-valve arrangement according to claim 14, wherein one of the further controllable throttling means in the third throttle section is an externally controllable throttle and the other is a throttle adjustable by the pressure drop at the externally controllable throttle.

* * * * *